United States Patent [19]

Steck et al.

[11] Patent Number: 5,047,161

[45] Date of Patent: Sep. 10, 1991

[54] PREPARATION OF ISOMETRIC COBALT- AND TITANIUM-CONTAINING MAGNETIC IRON OXIDES

[76] Inventors: Werner Steck, 4 Auerstrasse; Hartmut Hibst, 215 Sternstrasse, both of, 6700 Ludwigshafen; Helmut Jakusch, 6 c Lorscher Ring, 6710 Frankenthal, all of Fed. Rep. of Germany

[21] Appl. No.: 183,425

[22] Filed: Apr. 18, 1988

Related U.S. Application Data

[63] Continuation of Ser. No. 856,959, Apr. 29, 1986, abandoned.

[30] Foreign Application Priority Data

Apr. 30, 1985 [DE] Fed. Rep. of Germany ....... 3515517

[51] Int. Cl.[5] ...................... C04B 35/00; C01G 49/06
[52] U.S. Cl. ................................................. 252/62.59
[58] Field of Search ........................... 252/62.56, 62.59

[56] References Cited

U.S. PATENT DOCUMENTS 3,912,646 10/1975 Leitner et al. ................... 252/62.56
4,115,106 9/1978 Snavely et al. .............. 252/62.56 X

FOREIGN PATENT DOCUMENTS 50-37667 4/1975 Japan ................................ 252/62.56
1092009 11/1967 United Kingdom ............. 252/62.59

OTHER PUBLICATIONS

Hattori et al "Joint Intermag-MMM Conference" (Jul., 1979).

*Primary Examiner*—Jack Cooper
*Attorney, Agent, or Firm*—Keil & Weinkauf

[57] ABSTRACT

Isometric cobalt- and titanium-containing magnetic iron oxides are prepared by reacting acicular iron(III) oxide hydroxides with compounds of divalent cobalt and iron and compounds of tetravalent titanium in aqueous alkaline suspension at elevated temperature.

5 Claims, No Drawings

PREPARATION OF ISOMETRIC COBALT- AND TITANIUM-CONTAINING MAGNETIC IRON OXIDES

This application is a continuation of application Ser. No. 856,959, filed on Apr. 29, 1986, now abandoned.

The present invention relates to a process for preparing isometric cobalt- and titanium-containing magnetic iron oxides by reacting acicular iron(III) oxide hydroxides with compounds of divalent cobalt and iron and compounds of tetravalent titanium in aqueous alkaline suspension at elevated temperature.

The development of magnetic recording media has been directed for some considerable time toward high-density recording, in particular in order to meet the requirements of data and video signal storage. Recording materials which are regarded as particularly suitable for this purpose have extremely smooth surfaces and are based on magnetic materials which have very high coercive forces and are finely dispersed in organic binders. The recording wavelength decreases as the recording density increases, and consequently the reduction in signal output as a result of self-demagnetization of the recording layer becomes increasingly marked. Although it is possible to reduce the demagnetization by reducing the thickness of the layer, in the case of recording media possessing binder layers containing magnetic powders, not only the reduction in the amount of magnetic material present per unit area, i.e. in the residual induction of the layer, but also coating techniques impose limits on this measure. In another attempt to solve the problem of obtaining sufficient magnetization with thin layers, recording materials based on thin magnetic metal films have been proposed. However, the production of such homogeneous metal layers poses problems, and in particular mechanical problems arise during their use.

Because of the difficulties described, and in an attempt nevertheless to provide magnetic recording systems which have a high recording density coupled with high output levels, recording at right angles to the recording medium has also been proposed. For this purpose, the recording media have to possess layers which permit perpendicular magnetization at least in that area of the layer which is closest to the magnetic head (U.S. Pat. No. 3,052,567). In the further development of this principle, a number of different magnetic layers which exhibit magnetic anisotropy at right angles to the surface of the base, and are usually in the form of Co/Cr layers have been investigated. However, neither their manufacture nor the obtainable properties are satisfactory. A further major problem has been the development of a magnetic head suitable for the recording method.

Utilizing the vertical component of the magnetic field used for recording is regarded as another way of increasing the recording density while achieving high sensitivity. Here, the vertical component of a magnetic field produced by an annular head on the surface of the magnetic layer is utilized, this component being particularly effective at high recording densities. Suitable magnetic materials for such recording systems are products which give high relative remanence in all directions of the recording medium. Suitable for this purpose are magnetic isotropic materials, in particular those which are based on the conventional cubic iron oxides, especially cubic magnetite. The preparation of this magnetite is known, for instance starting from $\alpha$-, $\beta$- or $\gamma$-FeOOH together with Fe(OH)$_2$ (cf., inter alia, German Laid-Open Application DOS 2,508,155, DOS 2,746,359 and DOS 2,508,085 and Japanese Preliminary Published Application 36,932 (1983)). The preparation of cubic cobalt ferrite from cobalt hydroxide and $\gamma$-FeOOH has also been described (Krause et al., Z. f. anorg. Ch., 331 (1964), 231). In the course of determining crystallographic and magnetic structures by means of electron diffraction, the trivalent iron in cobalt ferrite was partially replaced by cobalt(II) and titanium(IV) ions (Abbes et al., J. of Magnetism and Magnetic Materials 31-34 (1983), 635–636). Japanese Preliminary Published Application 128,597/1978 discloses the isolation of titanium-, manganese- and nickel-modified gamma-iron-(III) oxide platelets from strongly alkaline medium by hydrothermal means. However, these materials have the disadvantage that they are not suitable for use in magnetic recording media either because they exhibit inferior magnetic properties, in particular a low coercive force, or because the magnetic properties deteriorate under thermal or mechanical stress.

It is an object of the present invention to provide a process for preparing isometric magnetic iron oxides, which, on the one hand, can be carried out in a simple and economical manner using the customary raw materials and, on the other, produces a magnetic material which is distinguished by isotropic magnetization, by a high coercive force suitable for recording media and, in particular, by a particularly narrow switching field distribution of the individual magnetizable particles. These properties are of particular importance for high-density recording.

We have found that this object is achieved by a process for preparing isometric cobalt- and titanium-containing magnetic iron oxides which contain from 2 to 8% by weight of cobalt and from 0.5 to 6% by weight of titanium(IV) ions, using readily accessible iron(II) chloride as starting material, and effecting modification of isotropic magnetite with cobalt, wherein acicular iron(III) oxide hydroxide is reacted in aqueous alkaline suspension with compounds of divalent cobalt and iron and of tetravalent titanium under inert gas at a pH higher than 8 and at from 35° C. to the boiling point of the suspension.

In a particularly advantageous embodiment of the process according to the invention, the resulting cobalt-, titanium- and iron(II)-containing iron oxides are at least partially oxidized with oxidizing gases at from 120° to 450° C.

Through the addition of titanium(IV) ions with or without the at least partial oxidation of the isometric iron oxides produced by the process according to the invention, it is possible to obtain materials whose coercive force is significantly higher than that of materials obtained without the addition of titanium. Apart from the advantages due to the reduction in the cobalt content, the relative remanence is increased and a narrower switching field distribution is achieved.

The starting material used for the process according to the invention is acicular iron(III) oxide hydroxide, which is obtainable in a conventional manner, acicular $\gamma$-FeOOH (lepidocrocite) being particularly preferred. It can be used for the reaction in the form of the washed or unwashed filter cake or as a previously dried pigment. The $\gamma$-FeOOH can be prepared for example by precipitating iron(II) hydroxide from an iron(II) chloride solution with ammonia at pH 7 and at from 20° to 50° C. and by subsequently oxidizing the precipitated hydroxide with air while maintaining the pH (Schwertmann, Zeitschrift f. Anorg. Chemie 298 (1959), 337-348). German Patent 1,223,352 discloses a further process for preparing lepidocrocite, wherein the nuclei are formed by precipitating iron(II) salt solutions with alkali or alkaline earth metal bases and oxidizing the iron(II) hydroxide or carbonate with oxygen, air, organic nitro compounds or other oxidizing agents and lepidocrocite nuclei can be grown in iron(II) salt solutions either in the presence of metallic iron or in iron(II) salt solutions with the simultaneous addition of equivalent amounts of iron(II) ions and alkali or alkaline earth metal solutions or suspensions or with the simultaneous addition of equivalent amounts of iron(II) ions and alkali or alkaline earth metal bases, solutions or suspensions using the oxidizing agents. The lepidocrocite can be obtained similarly by producing, in a first stage, a suspension of colloidal lepidocrocite nuclei by combining iron(II) chloride with aqueous alkali and stirring the resulting mixture while introducing an oxygen-containing gas up to a mixture pH of from 2.9 to 4.1 and then, in a second stage, adding to the suspension alkali and an oxygen-containing gas simultaneously and continuously at 26.7°-60° C. with vigorous stirring, while maintaining the pH in the presence of an excess of iron(II) chloride until 1.2-5 parts by weight of the total product have been formed per part by weight of nuclei. Suitable $\gamma$-FeOOH particles can also be obtained according to German Published Application DAS 1,061,760. Even $\gamma$-FeOOH which has been prepared in the presence of complexing agents for iron ions and/or in the presence of certain foreign ions in accordance with European Application No. 40,722, German Published Application DAS 1,219,009 and German Patents 1,223,352 and 1,225,157 is suitable.

In the process according to the invention, an aqueous suspension of iron(III) oxide hydroxide, preferably $\gamma$-FeOOH, is initially charged into a stirred vessel having an inert gas, preferably nitrogen, atmosphere. An iron(II) salt solution, usually $FeCl_2$, is added with stirring, together with or followed by a cobalt(II) and titanium(IV) salt solution, usually $CoCl_2$ and $TiCl_4$. After the pH has been adjusted to a value higher than 8 by means of NaOH, KOH or $NH_3$, or preferably to above 10 using the alkali metal hydroxides, the reaction mixture is kept at from 35° C. to the boiling point for from 5 minutes to 8 hours, preferably from 10 minutes to 6 hours, while continuing stirring. Thereafter the now black suspension is filtered, the filter cake is washed with water and the washed filter cake is dried at 50° to 350° C., preferably in a non-oxidizing atmosphere. The magnetic material obtained in this way consists of isometric particles. In the present context "isometric" means that the particles appear in electron micrographs to be substantially cubic: on average, all three spatial axes are of essentially the same size, and in no case are length/width ratios higher than 2:1 observed.

In a preferred embodiment of the process according to the invention, the $\gamma$-FeOOH synthesis is started in the manner described above, but the reaction is not taken to completion, being discontinued after partial conversion of the Fe(II) ions, i.e. after the $\gamma$-FeOOH nucleation phase. To the resulting $\gamma$-FeOOH nuclei suspension are then added a Co(II) salt solution, a $TiCl_4$ solution and one of the above-mentioned bases after prior blanketing of the contents of the vessel with an inert gas atmosphere. As a result of the addition of the base, the Fe(II) ions not yet oxidized to $\gamma$-FeOOH are precipitated as $Fe(OH)_2$. Following the precipitation of $Fe(OH)_2$, the $\gamma$-FeOOH is then reacted at a pH of more than 8 to about 14, preferably from 9 to 13, to give cobalt- and titanium-containing, magnetic iron oxide. The reaction is expediently carried out at from 35° C. to the boiling point of the suspension. Since the reaction proceeds very rapidly, reaction times of from 10 minutes to 8 hours, preferably up to 6 hours, are sufficient, in particular at elevated temperatures. Working up to give the dried end product is effected as described above.

In a further embodiment of the process according to the invention, all or some of the Co(II) ions and Ti(IV) ions are added as early as the start of the $\gamma$-FeOOH synthesis. Apart from this modification, the process is carried out as described above.

The magnetic iron oxides prepared according to the invention can be oxidized in a conventional manner with oxidizing gases, e.g. oxygen or air, at 120° to 450° C. Depending on the specific oxidation temperature used, oxidation times of from 10 minutes to 6 hours have proved advantageous.

The oxidation of the iron(II) ions can be effected completely or only partially. The highest $H_c$ values and the highest values for the relative remanence, i.e. the ratio of the specific residual magnetization of the powder to its specific saturation magnetization, are obtained after oxidation to Fe(II) contents of less than about 0.5% by weight.

Furthermore, the magnetic iron oxides prepared by the process according to the invention can be aftertreated in a conventional manner in a reducing atmosphere, for example hydrogen and/or carbon monoxide and/or by means of organic substances which decompose in the presence of iron oxides, with a view to improving their magnetic properties, for example the specific saturation magnetization, or to increasing the crystallite size. To avoid a reduction to metallic phases, the simultaneous presence of steam is advantageous. The aftertreatment is customarily effected at 250° to 600° C. in the course of from 10 minutes to 2 hours.

Finally, it should also be pointed out that the isometric magnetic iron oxides prepared according to the invention are also suitable for use as printing ink pigments or for preparing magnetic toners.

The cobalt-containing isometric magnetic iron oxides prepared according to the invention are mainly intended to be used as magnetic material in the manufacture of magnetic recording media. Surprisingly, they enable the recording properties which are influenced by the coercive force and switching field distribution to be modified in an advantageous manner. With their high relative remanence in all three orthogonal directions, they can be used particularly advantageously in the manufacture of magnetic recording media where the advantages of recording by means of the effective vertical component are to be utilized for increasing the bit density and for recording high frequencies.

The recording media are manufactured in a conventional manner, the magnetic materials being dispersed in polymeric binders. Suitable binders are the compounds known for this purpose, such as homopolymers and copolymers of polyvinyl derivatives, polyurethanes, polyesters and the like. The binders are used in solution in suitable organic solvents which may, if desired, contain further additives. The magnetic layers are applied to rigid or flexible bases such as disks, plastic films and cards.

The present invention is illustrated by the following Examples; the comparative experiments represent the state of the art. The Co(II), Ti(IV) or Fe(II) percentages are by weight, based on the whole compound. The magnetic properties of the powder samples were measured in a vibrating sample magnetometer in a magnetic field of 160 kA/m or, after magnetization to saturation in a discharge capacitor, in a vibrating sample magnetometer. In the case of the powder measurements, the coercive force, $H_c$, measured in [kA/m], is based on a tamped density of $\rho = 1.2$ g/cm$^3$. The specific remanence ($M_r/\rho$) and specific saturation magnetization ($M_m/\rho$) of the powders are each expressed in [nTm$^3$/g]. The residual induction of the tapes is given in [mT].

The switching field distribution (SFD) is a measure of the magnetic homogeneity of a recording layer which in general consists of individual magnetizable particles, and indicates the magnetic field range within which the magnetization of the individual particles is reversed. The switching field distribution of a magnetic recording layer is of crucial importance in the recording of short wavelengths (high frequencies). A narrow SFD reduces the distance between areas of opposite magnetization and thus permits a high recording density.

$(1-S^*)$ serves as the quantity for measuring the SFD, and is obtained from the slope of the hysteresis curve at $M=0$ (i.e. $H_c$) in accordance with equation $dM/dH = M_R/((1-S^*) \times H_c)$ (M. L. Williams, R. L. Comstock, AIP Conf. Proc. 5 (1971), 725).

EXAMPLE 1

Sample 1/1

In a jacketed 10-liter glass vessel equipped with reflux condenser, stirrer, pH electrode and temperature control means, 4.24 moles of FeCl$_2$ (538 g of FeCl$_2$ corresponding to 1,346 ml of a technical-grade 29.9% strength FeCl$_2$ solution) and 0.23 mole of CoCl$_2$ corresponding to 55.26 g of CoCl$_2$.6H$_2$O— were dissolved with water at 20° C., while stirring and passing through nitrogen, to give a total volume of 6 l of solution. 6.73 g of TiCl$_4$ corresponding to 3.89 ml of TiCl$_4$ were then added. 1,369 ml of 15.1% strength sodium hydroxide solution corresponding to 6.07 moles of NaOH were then introduced with stirring, which was continued for a further 10 minutes. Then air, instead of nitrogen, was passed through the suspension until after 105 minutes the pH had dropped to less than 4. Subsequently, nitrogen, instead of air, was passed through the $\gamma$-FeOOH suspension thus obtained; here again, stirring was continued for 10 minutes. The suspension was then brought with NaOH to pH 9.5, and its temperature was raised to 80° C. in the course of 3 hours, with continuous stirring. This temperature was maintained for 3 hours and, after cooling down to 20° C., the black suspension was filtered; the dark precipitate was washed with water until the filtrate was substantially anion-free, and the filter cake was then dried at 50° C. in a water jet vacuum (sample 1). Half of the dry powder (sample 1) was oxidized at 350° C. in an air stream in a tubular furnace in the course of 30 minutes. The Fe(II) content of sample 1/1 Ox was below 0.2% by weight.

Samples ½ and ½ Ox

The procedure followed was as in Example 1/1, except that a higher titanium(IV) content corresponding to 13.46 g of TiCl$_4$ (7.78 ml of TiCl$_4$) was employed. The oxidation time in the precipitation phase up to pH<4 was 95 minutes.

Samples ⅓ and ⅓ Ox

The procedure followed was as in Example 1/1, except that 40.38 g of TiCl$_4$ corresponding to 23.3 ml of TiCl$_4$ was used. The oxidation period in the precipitation phase up to pH<4 was 85 minutes.

Samples ¼ and ¼ Ox

The procedure followed was as in Example ½, except that the TiCl$_4$ was predissolved in the FeCl$_2$ solution. The oxidation period in the precipitation phase up to pH<4 was 105 minutes.

Samples 1/5 and 1/5 Ox

The procedure followed was as in Example ⅓, except that the TiCl$_4$ was predissolved in the FeCl$_2$ solution. The oxidation period in the precipitation phase up to pH<4 was 95 minutes.

The results of the measurements on the samples of Example 1 are listed in Table 1.

EXAMPLE 2

Samples 2/1 and 2/1 Ox

The procedure of Example 1 was followed—except that titanium(IV) was omitted from the starting mixture—until after 85 minutes the pH had dropped to below 4. While continuing stirring of the resulting suspension of cobalt-containing $\gamma$-FeOOH and after replacing the air stream by nitrogen, 6.73 g of TiCl$_4$ (dissolved in 10 ml of H$_2$O and 10 ml of concentrated HCl) were added, and stirring was continued at 300 rpm for 10 minutes. The suspension was then brought with NaOH to pH 9.5. The temperature was then raised as in Example 1 to 80° C., the further procedure being as described in Example 1 (samples 2/1 and 2/1 Ox).

Samples 2/2 and 2/2 Ox

The procedure followed was as in Example 2/1, except that 13.46 g of TiCl$_4$ (dissolved in 20 ml of H$_2$O and 20 ml of concentrated HCl) was used.

Samples 2/2 and ⅔ Ox

The procedure followed was as in Example 2/1, except that 40.38 g of TiCl$_4$ (dissolved in 20 ml of H$_2$O and 20 ml of concentrated HCl) was used.

Samples 2/4 and 2/4 Ox

The procedure followed was as in Example 2/1, except that 80.76 g of TiCl$_4$ (dissolved in 20 ml of H$_2$O and 20 ml of concentrated HCl) was used.

The results of the measurements on the samples of Example 2 are listed in Table 1.

COMPARATIVE EXAMPLE V1

Samples V1 and V1 Ox

The procedure followed was as in Example 1, except that no titanium(IV) was employed. The oxidation period in the precipitation phase up to pH<4 was 130 minutes. Sample V1 was oxidized to V1 Ox as described in Example 1.

The results of the measurements on samples V1 and V1 Ox are listed in Table 1.

EXAMPLE 3

Samples 3/1 and 3/1 Ox

The procedure followed was as in Example 3, except that the FeCl$_2$ was replaced by 1,180.3 g of FeSO$_4$.7H$_2$O and the CoCl$_2$.6H$_2$O by 71.8 g of CoSO$_4$.7H$_2$O. The oxidation period in the precipitation phase up to pH<4 was 14.5 hours. The resulting suspension of cobalt-containing γ-FeOOH then had added to it, as described in Example 3, 40.38 g of TiCl$_4$, and the further procedure of Example 3 was followed.

The results of the measurements on samples 3/1 and 3/1 Ox are listed in Table 1.

EXAMPLE 4

Samples 4/1 and 4/1 Ox

In the glass apparatus described in Example 1, 160 g of γ-FeOOH having a BET value of 46 m$^2$/g were suspended, with stirring, in 2,250 ml of water, and a stream of nitrogen was passed in. Then at 22° C. first 37 g of Fe(II), corresponding to 677 ml of 1M FeCl$_2$ solution, were added, followed 10 minutes later by 13.3 g of cobalt, corresponding to 22.5 ml of 1M CoCl$_2$ solution. 120 g of NaOH, dissolved in 750 ml of water, were then added with further stirring in the course of 10 minutes. Thereafter 16.62 g of TiCl$_4$, dissolved in 20 ml of H$_2$O and 20 ml of concentrated HCl, were added. The temperature of the suspension was then raised to 93° C. in the course of 2.5 hours, which temperature was maintained for one hour. After cooling down to room temperature, the suspension was worked up as described in Example 1.

The results of the measurements on samples 4/1 and 4/1 Ox are listed in Table 1.

TABLE 1

| Example | Sample | Ti (IV) (% by weight) | H$_c$ | Mm/ρ | Mr/ρ | Mr/Mm | SFD | BET |
|---|---|---|---|---|---|---|---|---|
| V1 | V1 | — | 36 | 88 | 52 | 0.59 | 0.56 | |
| | V1 Ox | — | 61 | 73 | 59 | 0.80 | 0.41 | 18.2 |
| 1 | 1/1 | 0.5 | 36 | 92 | 56 | 0.61 | 0.58 | 29.9 |
| | 1/1 Ox | — | 65 | 76 | 60 | 0.80 | 0.47 | — |
| | 1/2 | 1.0 | 44 | 86 | 47 | 0.55 | 0.66 | 26.7 |
| | 1/2 Ox | — | 68 | 75 | 61 | 0.81 | 0.39 | — |
| | 1/3 | 3.0 | 31 | 90 | 50 | 0.55 | 0.68 | 32.8 |
| | 1/3 Ox | — | 81 | 71 | 60 | 0.85 | 0.44 | — |
| | 1/4 | 1.0 | 36 | 107 | 59 | 0.55 | 0.63 | 21.7 |
| | 1/4 Ox | — | 87 | 78 | 67 | 0.87 | 0.40 | — |
| | 1/5 | 3.0 | 35 | 92 | 50 | 0.54 | 0.79 | — |
| | 1/5 Ox | — | 85 | 70 | 60 | 0.85 | 0.44 | — |
| 2 | 2/1 | 0.5 | 33 | 97 | 61 | 0.62 | 0.63 | 18.0 |
| | 2/1 Ox | — | 89 | 79 | 69 | 0.88 | 0.40 | — |
| | 2/2 | 1.0 | 33 | 96 | 62 | 0.65 | 0.62 | 18.9 |
| | 2/2 Ox | — | 90 | 79 | 69 | 0.88 | 0.51 | — |
| 2 | 2/3 | 3.0 | 38 | 88 | 56 | 0.64 | 0.65 | 29.6 |
| | 2/3 Ox | — | 99 | 73 | 65 | 0.89 | 0.45 | — |
| | 2/4 | 6.0 | 36 | 77 | 48 | 0.63 | 0.77 | 44.3 |
| | 2/4 Ox | — | 91 | 66 | 57 | 0.87 | 0.59 | — |
| 3 | 3/1 | 3.0 | 53 | 62 | 35 | 0.57 | 0.64 | — |
| | 3/1 Ox | — | 92 | 56 | 48 | 0.86 | 0.47 | — |
| 4 | 4/1 | 2.0 | 45 | 64 | 33 | 0.52 | 0.73 | — |
| | 4/1 Ox | — | 81 | 57 | 44 | 0.77 | 0.64 | — |

EXAMPLES 5a–5g

A ball mill which had a capacity of 250 parts by volume and contained 100 parts of steel balls was charged, in each case, with 50 parts of the magnetic iron oxide indicated in Table 2, 3 parts of a long-chain amphoteric, organophilic dispersant, 0.05 part of a silicone oil and 0.5 part of an isomeric carboxylic acid mixture having a flow point <5° C., 6.6 parts of a commercially available isocyanate-free polyester urethane prepared from adipic acid, butane-1,4-diol and 4,4-dicyanatodiphenylmethane and having a K value of 61 (measured as a 1% strength solution in tetrahydrofuran) and 25 parts of a vinyl chloride/ethyl maleate copolymer having a K value of 59 (likewise measured as a 1% strength solution in tetrahydrofuran), and also with 78 parts of a mixture of equal parts of tetrahydrofuran and 1,4-dioxane, the said binders being added in the form of their solutions in the said solvent mixture. After a dispersing time of 3.5 hours, the magnetic dispersion was filtered and then applied by means of a conventional coating apparatus to a 12 μm thick polyethylene terephthalate film, so that, after drying in a tunnel dryer and subsequent calendering on a multi-roll calender heated to 80° C., a layer having a thickness of 4.1 μm was obtained. The magnetic properties of the magnetic layers are indicated in Table 2.

TABLE 2

| Example | Magnetic material | H$_c$ | Mr | Mr/Mm | SFD |
|---|---|---|---|---|---|
| 5a | 1/2 | 37 | 134 | 0.62 | 0.52 |
| 5b | 1/2 Ox | 77 | 140 | 0.84 | 0.25 |
| 5c | 1/4 Ox | 82 | 159 | 0.87 | 0.22 |
| 5d | 1/5 Ox | 78 | 136 | 0.85 | 0.27 |
| 5e | 2/3 | 33 | 150 | 0.74 | 0.47 |
| 5f | 2/3 Ox | 99 | 152 | 0.91 | 0.25 |
| 5g | V1 Ox | 61 | 141 | 0.83 | 0.27 |

We claim:

1. A method of improving the magnetic properties of isometric magnetic iron oxides comprising reacting acicular γ-FeOOH in an aqueous alkaline suspension with Co(II) ions, Ti(IV) ions and Fe(II) ions under inert gas at a pH higher than 8 and at from 35° C. to the boiling point of the suspension to produce isometric cobalt- and titanium-containing magnetic iron oxide which contains from 2 to 8% by weight of cobalt(II) ions and from 0.5 to 6% by weight of titanium(IV) ions.

2. The method of claim 1 wherein the acicular γ-FeOOH is reacted in aqueous alkaline suspension with Co(II) ions, Ti(IV) ions and Fe(II) ions under inert gas at a pH higher than 8 and at from 35° C. to the boiling point of the suspension, and the resulting product is subsequently at least partially oxidized with oxidizing gases at 120°–450° C.

3. The method of claim 1 wherein said acicular γ-FeOOH is Co(II)- and Ti(IV)-free γ-FeOOH.

4. The method of claim 1 wherein said acicular γ-FeOOH contains Co(II), Ti(IV) or mixture thereof.

5. A method of improving the magnetic properties of isometric magnetic iron oxides comprising precipitating iron(II) hydroxide from an Fe(II) salt solution with aqueous alkali, oxidizing the precipitated iron(II) hydroxide to form a suspension of γ-FeOOH nuclei, blanketing the suspension with an inert gas atmosphere, adding Co(II) ions, Ti(IV) ions and a base to the suspension to precipitate Fe(II) ions as Fe(OH)$_2$ and reacting the γ-FeOOH at a pH of more than 8 and at from 35° C. to the boiling point of the suspension to produce isometric cobalt-and titanium-containing magnetic iron oxide which contains from 2 to 8% by weight of cobalt(II) ions and from 0.5 to 6% by weight of titanium(IV) ions.

* * * * *